United States Patent

Rousseau

[15] 3,668,314

[45] June 6, 1972

[54] SUPERVISORY CIRCUIT FOR ELECTRONICALLY MONITORING A TELEGRAPHY LINE

[72] Inventor: Claude Rousseau, Joinville-le-Pont, France

[73] Assignee: C.I.T. Compagnie Industrielle des Telecommunications, Paris, France

[22] Filed: Dec. 31, 1969

[21] Appl. No.: 889,359

[30] Foreign Application Priority Data

Dec. 31, 1968 France ....................................183136

[52] U.S. Cl. .......................................................... 178/69 G

[51] Int. Cl. ......................................................... H04l 25/02

[58] Field of Search ................................................ 178/69 G

[56] References Cited

UNITED STATES PATENTS 3,317,668 5/1967 Johnsen ................................178/69 G

*Primary Examiner*—Kathleen H. Claffy

*Assistant Examiner*—Douglas W. Olms

*Attorney*—Craig, Antonelli & Hill

[57] ABSTRACT

An electronic supervisory circuit indicates the condition of a telegraphy line being supervised without interfering with the transmission of the telegraphy signals. The supervisory circuit employs a holding circuit responsive to the detection of modulated line signals which maintains the output of the supervisory circuit during the periods when the modulated signals are transmitted over the telegraphy line. An auxiliary output is also employed to indicate the instantaneous condition of the line.

18 Claims, 1 Drawing Figure

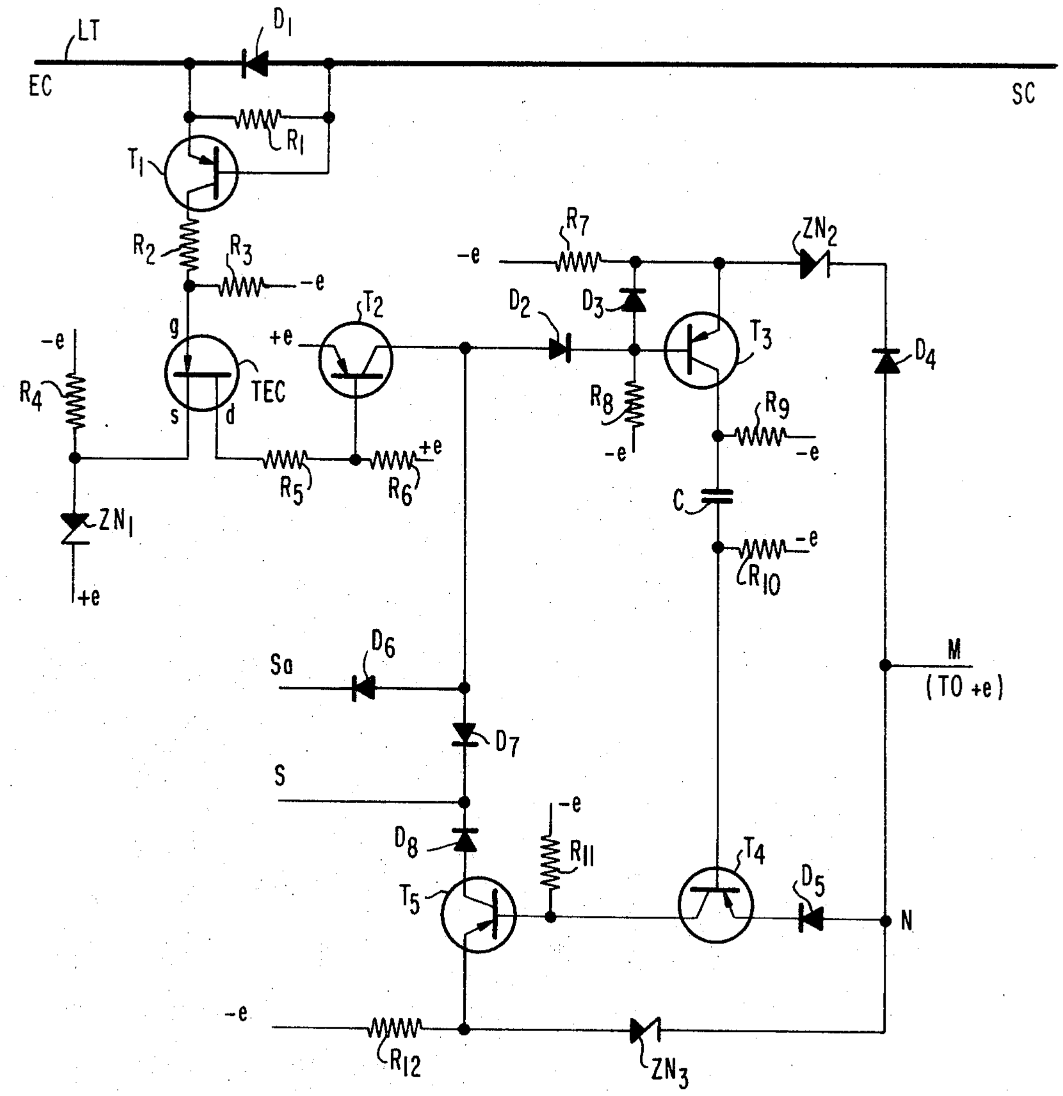
LT
D1
EC
SC
R1
T1
R2
R3
-e
g
TEC
s
d
-e
R4
ZN1
+e
+e
T2
R5
R6
+e
-e
R7
ZN2
D2
D3
T3
D4
R8
-e
R9
-e
C
R10
-e
M
(TO +e)
Sa
D6
D7
S
-e
D8
R11
T4
D5
T5
N
-e
R12
ZN3

SUPERVISORY CIRCUIT FOR ELECTRONICALLY MONITORING A TELEGRAPHY LINE

This invention concerns an electronic detection and control device more particularly for a supervisory circuit, in particular in telegraph exchanges, for interpreting the state of a transmission or reception channel without disturbing the normal operation of the channel.

Supervisory devices are already known; the oldest consisted of conventional electromagnetic relays and in themselves had considerable intrinsic defects; rapid wear, frequent necessary adjustments, too small a delay margin in certain modulation cases (32nd combination), considerable manufacturing scatter from one specimen to another, and above all impossibility of their being adapted to modulation rates above 50 bauds.

Another supervisory device described in French patent specification 1,405,994, filed by the applicant on June 3, 1964, represented a very considerable improvement over electromagnetic relays; its operation, however, requires an external voltage source at 20 Kc/s and adjustment during the course of the control, due to scatter of the manufacturing characteristics of the toroids.

The device according to the invention provides a novel solution of the supervisory device. In particular, it permits very much higher modulation rates than those possible with the prior devices. It consists essentially of transistors as regards both the line signal detection element and the delay element.

The device according to the invention may be situated at any point on a telegraph channel, more particularly in the connection circuit of a telegraph autoswitch or in a teleprinter operating cubicle or any other place where the condition of a telegraph channel can be supervised. The connection circuit is the element controlled by the register which establishes a connection between the calling and called users. Thus, when the register, after having controlled the selection of the called user verified his category and controlled the passage of his call sign to the calling user, controls the connection between calling user and called user, a resting current is set up, the effect of which is to produce the operation of the supervisory device.

Telegraph modulation, given by the conversation and consisting of a sequence of positive or negative moments should not permit the return of the supervisory device to the resting condition. On the other hand, any negative signal of rather long duration ought to permit the return to rest of the supervisory device; such a signal corresponds to the end-of-communication signal. The return to rest of the device (which is interpreted by the absence of output potential) then results in the release of the chain of connection elements.

The device according to the invention is more particularly characterized in that it comprises in combination a first transistorized circuit for the detection of the modulated line current and a second transistorized circuit comprising a delay circuit maintaining the device in the operative condition during modulation.

According to one feature of the invention, the device essentially consists of a line polarity detector comprising three transistors and of a delay circuit also comprising three transistors and an RC circuit, the purpose of which is to maintain the device in the operative state during modulation.

According to another feature of the invention, the detection circuit, blocked by a negative line current and conducting for a positive current, is connected, on the one hand, to the output of the device and, on the other hand, to the input of the delay circuit, whose output is connected to the output of the device, such that the output control potential of the device can come directly from the detection circuit when a positive line polarity is concerned, or from the delay circuit when negative modulation moments are concerned.

According to another feature of the invention, in the detection circuit, a field effect transistor is inserted between the first transistor, connected to the line, and the second transistor, whose collector is at a point common to the output of the device and to the input of the delay circuit, a resistance of very high value being inserted between the output of the first transistor and the grid of the field effect transistor, the latter requiring only a voltage for its control, unlike conventional transistors, which necessitate a current.

According to another feature of the invention, in the delay circuit an RC circuit is connected in series between the collector of the third transistor and the base of the fourth transistor, the base of the third transistor being connected to the output of the detection circuit, the collector of the fourth transistor being connected to the base of the fifth transistor and the collector of the latter being connected to the output of the device, such that the detection circuit being conducting, the capacitor is charged when positive line polarities arrive, and such that the detection circuit being blocked, the capacitor is discharged when negative line polarities arrive, the discharge of the capacitor, by blocking the fourth transistor, having the effect of rendering the fifth transistor conducting, the latter thus maintaining the output at its working potential during negative polarities if their duration is less than the discharge time of the capacitor.

The device according to the invention, shunted on the line, has the advantage of not resulting in any substantial distortion or attenuation of the line signals; it has a very high impedance so that the shunted line current is negligible.

The features of the invention will appear from the following description with reference to the single FIGURE of the accompanying drawing, which gives by way of example a possible embodiment of the device according to the invention.

In the embodiment shown in the FIGURE, the detection circuit of the device according to the invention comprises substantially transistors T1, TEC and T2: T1 and T2 are conventional PNP type transistors, the transistor TEC is a field effect transistor; the delay circuit comprises substantially the PNP transistors T3, T4 and T5, and a delay circuit comprising a capacitor C and a resistor R10.

On the telegraph line wire LT, the EC side is assumed to be connected to a signal transmission device, and the SC side is assumed to be connected to a signal receiving device, a teleprinter for example.

A diode D1 ensuring continuity of the channel during the transmission of negative moments, in series with the line wire, has its cathode directed towards EC and its anode directed towards SC. Shunted across the terminals of the diode D1 is a resistance R1 of fairly low value, whose end, at the cathode side of D1, is connected to the emitter of the transistor T1, and whose end, at the anode side of D1, is connected to the base of transistor T1. The resistance ensures a minimum triggering threshold for preventing the device from being affected by a parasitic currents. The collector of transistor T1 is connected across a resistance R2 to the grid *g* of a field effect transistor TEC, the said grid being in turn connected to negative polarity across a resistance R3. The source electrode *s* of TEC is connected at the common point to a resistance R4, whose other end is connected to negative polarity, and to a Zener diode ZN1, whose other terminal, the cathode, is connected to positive polarity. The drain *d* of TEC is connected to the base of a transistor T2 across a resistance R5, the said base of T2 being also connected to positive polarity across a resistance R6. The emitter of T2 is connected directly to positive polarity and its collector to the common point of three circuit branches; the first branch connects it to the base of a transistor T3 across a diode D2, the second branch connects it to the auxiliary output Sa across a diode D6, and the third branch connects it to the output S of the device according to the invention across a diode D7, the diodes D2, D6 and D7 being oriented such that their anodes are connected to the collector of T2. The base of transistor T3 is also connected to the emitter of T3 across the protection diode D3, and to negative polarity across a resistance R8; D3 is oriented such that its anode is connected to the base of T3. The emitter of T3 is also connected to negative polarity across a resistance R7 and also to a common point N across a Zener diode ZN2 and a diode D4 in series, the diodes ZN2 and D4 being oriented such that their cathodes are connected to a common point. A branch M, on the connection between the diode D4 and the point N, can receive positive polarity either directly or by means of one or more contacts, passage across one or more contacts being to avoid the effect on the device of positive transients on the telegraph channel. In the description of the mode of operation, it will be assumed that positive polarity is connected directly to the point M. The collector of transistor T3 is connected to negative polarity across a resistance R9 and also to the top plate of a capacitor C. The bottom plate of the said capacitor C is connected directly to the base of a transistor T4; it is also connected to negative polarity across a resistance R10 of high value compared with R9. The emitter of transistor T4 is connected to the point N across a protection diode D5, the latter being oriented such that its cathode is connected to the emitter. The collector of T4 is connected directly to the base of a transistor T5, the base of T5 being also connected to negative polarity across a resistance R11. The collector of T5 is connected to the output S across a diode D8 oriented such that its anode is connected to the collector. The emitter of transistor T5 is connected to negative polarity across a resistance R12 and also to the common point M across a Zener diode ZN3 oriented such that is anode is connected to the emitter of transistor T5.

Before proceeding to the mode of operation of the device according to the invention, some explanations will be given concerning telegraph operation (assuming a type A network)

an available line is characterized by negative current, the calling signal appears when a positive current replaces the negative current, the end signal is shown by the return of the line to negative.

It is obviously necessary to differentiate the negative currents constituting modulation, during which the device should give an output control potential of the permanent negative current forming the release signal, at the end of which the device should no longer give an output control potential.

Discrimination is effected by measuring the durations of the negative currents. In automatic transmission (modulation of seven elements per character, at 50 bauds), a limit case is provided when "32nd combinations" are concerned; the 32nd combination comprises in fact a negative start followed by five negative moments, then the positive stop, corresponding to 120 ms of negative signal and 20 ms of positive signal. Furthermore, as there may be some distortion of the signals (40 percent of distortion over the start) it is possible to assume as the most unfavorable value in the transmission of a 32nd combination of the ratio 128/12, that is to say 128 ms of negative signal for 12 ms of positive signal. The device according to the invention ought to continue to give a control potential at the output in this limit case.

The device according to the invention, in operation at 200 bauds gives for the unfavorable limit case the ratio 32/3 in the case where No. 2 telegraph alphabet is used.

The operation according to the invention, will be examined in the principal possible conditions:

in the case of a permanent negative line current in the case of a permanent positive line current in the case of modulation in the case of release.

Permanent Negative Line Current

The diode D1 being oriented in its conducting direction, the potential of the emitter of transistor T1 is very substantially the same as that of the base. The transistor T1 is blocked. Under these conditions, the grid *g* of the field effect transistor TEC being biased at the potential $-e$ of the battery, whereas the source *s* being connected to the voltage divider formed by the resistance R4 and the diode ZN1, is at a less negative potential (therefore positive relative to the grid), keeps the transistor TEC blocked. The transistor T2 is also blocked, its emitter and base being at the same potential $-e$. If a positive potential arrives directly on the wire M, transistors T3 and T4 are conducting, the potential of the emitters being higher than that of the bases, but transistor T5 remains blocked. No control potential appears, therefore, either at the output Sa or at the output S. The capacitor C is discharged.

Permanent Positive Line Current

The diode D1 is blocked for positive line current arriving by EC, the potential of the emitter of T1 is a higher than that of the base, a circuit is closed across the resistance R1 and earth by SC. The transistor T1 is therefore conducting. The grid *g* of the transistor TEC assumes a positive potential, the resistance R2 being less than R3; the transistor TEC is therefore conducting (source *s* negative). A circuit is therefore closed by the voltage divider R4—ZN1, transistor TEC, resistances R5 and R6, the effect of which is to render the potential of the base of transistor T2 negative relative to the potential $+e$ of the emitter. The transistor T2, in its turn, becomes conducting and delivers respectively across the diodes D6 and D7 to the output Sa and S of the device. The emitter of transistor T3 is connected to the positive polarity of the point M across the diodes ZN2 and D4. On the other hand, transistor T2 applies positive polarity ($+e$) to the base of T3 across the diode D2; transistor T3, having thus a more positive potential on its base than on its emitter, remains blocked. Transistor T4 is conducting, positive polarity of the wire M being applied to its emitter across the diode D5, whereas its base is at negative potential across the resistance R10. T4, being conducting, blocks the transistor T5 in the same way as was shown in the preceding case. The capacitor C is charged by negative polarity across R9 on its top plate and by the positive polarity on the emitter of T4 received on the bottom plate across the emitter-base junction.

On reception of a positive line signal, the outputs Sa and S therefore give immediately a positive potential respectively across the diodes D6 and D7.

Line Modulation

The line being in the calling state, due to the fact that a telegraph positive signal is on the line, the appearance of a negative start of a combination has the effect of blocking the transistors T1, TEC and T2 (see the case of permanent negative line current). The positive polarity applied to the wire M renders transistor T3 conducting, its base becoming negative across the resistance R8 relative to its emitter, and the diode D3 being blocked. The transistor T3 applies positive polarity to the top plate of the capacitor C, previously connected to negative polarity. The capacitor C discharges through the resistance R10, while maintaining on its bottom plate a positive voltage relative to the supply voltage $+e$ during the whole of the discharge time; the duration of the discharge is a function of the time constant formed by the resistance R10 and capacitor C. In addition, this strongly positive potential of the bottom plate of C blocks the transistor T4, the base potential of the latter being higher than the potential of its emitter. The transistor T5, which was blocked, becomes conducting (base negative relative to the emitter) and applies a positive potential to the output S alone, the diode D7 being blocked with respect to the output Sa.

If the first characteristic moment is positive, T1, TEC, T2 become conducting again and the output Sa a and S are at positive potential; T3 is blocked, T4 becomes conducting again and the capacitor C is charged. T5 is blocked by T4. The output S remains constantly positive.

If the first characteristic moment is negative, the condition established by the arrival of the start is continued as long as the capacitor C maintains a blocking potential on T4. The time constant is thus provided for keeping T4 blocked during the most unfavorable limit time, that is to say, for at least 128 ms (actually 350 ms).

The circuit is thus maintained during the modulation, due to charging and discharging of the capacitor C, charging effected across resistor R9 (of low value relative to R10) being of a much shorter duration than discharge effected across the resistance R10.

Release

A negative release signal occurring on the telegraph line after a positive signal, results in drop-out of the supervisory relay connected to the output S after the delay has expired, by virtue of the time constant of the device.

In fact, as before, the transistors T1, TEC and T2 are blocked. The transistor T3 becomes conducting and produces the discharge of the capacitor C. The transistor T4 is blocked and T5 becomes conducting, maintaining positive polarity on the wire S. However, the duration of the negative line signal exceeding the discharge time of the capacitor, by which T4 was blocked, the transistor T4 becomes conducting again as soon as the potential of its emitter is again higher than that of its base. T4 therefore blocks T5. The output S henceforward does not receive positive polarity either by the output of T2 (blocked) or by the output of T5 (blocked). Drop-out of the supervisory relay is therefore ordered. It should be noted that a line break of duration equal to the negative live current could produce the same effects, the device being triggered only for positive line currents.

The mode of operation may furthermore be summarized in the following table:

| | Permanent | Permanent | Modulation | | Release | |
|---|---|---|---|---|---|---|
| Elements involved | – | + | – | + | Before 350 ms. | After 350 ms. |
| Transistor: | | | | | | |
| T1 | Blocked | Conducting | Blocked | Conducting | Blocked | Blocked. |
| TEC | do | do | do | do | do | Do. |
| T2 | do | do | do | do | do | Do. |
| T3 | Conducting | Blocked | Conducting | Blocked | Conducting | Conducting. |
| T4 | do | Conducting | Blocked | Conducting | Blocked | Do. |
| T5 | Blocked | Blocked | Conducting | Blocked | Conducting | Blocked. |
| Capacitor C | Discharged | Is charged | Is discharged | Is recharged | Is discharged | Discharged. |
| Output: | | | | | | |
| Sa | No control | Control | No control | Control | No control | No control. |
| S | do | do | Control | do | Control | Do. |

The scope of the invention would obviously not be exceeded by the use of transistors of opposite type, by a reversal of the diodes combined with a reversal of the supplies, or by the use of means equivalent to the means employed, the embodiment described being given merely as example.

It is also necessary to note the possibility in the device according to the invention of modifying the time constant by the choice of the values of C and R10.

Finally, the invention may be used irrespective of the type of network defined by the C.C.I.T.T.

I claim:

1. A supervisory electronic control apparatus for monitoring telegraphy line signals and adapted to be inserted at any point in a telegraphy channel, comprising:

first means responsive to the condition of the telegraphy line for generating a supervisory output signal upon the receipt of a calling signal potential on said telegraphy line, including a first transistor circuit connected in the line for detecting the polarity of the line potential and for generating a signal representative of said polarity, and a first voltage polarity sensitive circuit responsive to the signal generated by said first transistor circuit for delivering a supervisory output signal at the output of said first means when said transistor circuit detects the polarity of the line potential to be that of a calling signal; and second means responsive to said first means for maintaining the generation of said supervisory output signal during the transmission of modulated telegraphy signals, which follow said calling signal over said telegraphy channel, and for terminating the generation of said supervisory output signal a predetermined time after the receipt of a released signal potential on said telegraphy line, including a delay circuit responsive to the signal generated by said first transistor circuit for maintaining the delivery of said supervisory output signals by said first voltage polarity sensitive circuit during the portions of transmission of modulated telegraphy signals when the polarity of the line potential is opposite to the polarity of the line potential during the transmission of a calling signal, wherein said delay circuit includes a holding circuit for storing a reference potential, a pair of control transistors connected to opposite sides of said holding circuit, one of said control transistors being connected also to said first transistor circuit for controlling the storing of said reference potential in said holding circuit, in response to the signal generated by said first transistor circuit, the other of said control transistors being responsive to the discharging of the reference potential from said holding circuit, for controlling the length of time that the delivery of said supervisory output signal is maintained.

2. A supervisory electronic control apparatus according to claim 1, further including third means responsive to said first means for generating an auxiliary output signal representative of the instantaneous condition of the telegraphy line.

3. A supervisory electronic control apparatus according to claim 1, wherein said delay circuit further includes a supervisory output control transistor connected to said voltage polarity sensitive circuit and said other control transistor for controlling the maintaining of the supervisory output signal during the portion of the transmission of the modulated telegraphy signals when the polarity of the line potential is opposite to the polarity of the line potential during the transmission of a calling signal.

4. A supervisory electronic control apparatus according to claim 1, wherein said holding circuit includes a capacitor connected between said pair of control transistors and a discharging resistor connected between the side of said capacitor, which is connected to said other control transistor, and a fixed reference potential for discharging said capacitor.

5. A supervisory electronic control apparatus according to claim 3, wherein said holding circuit includes a capacitor connected between said pair of control transistors and a discharging resistor connected between the side of said capacitor, which is connected to said other control transistor, and a fixed reference potential for discharging said capacitor, and for rendering said other control transistor conductive a predetermined time after the termination of said signal generated by said first transistor circuit representative of said polarity, thereby cutting off said supervisory output control transistor and terminating the generation of said supervisory output signal.

6. A supervisory electronic control apparatus according to claim 5, wherein said first transistor circuit includes a first detection transistor connected across a diode inserted in the telegraphy line, a field effect transistor coupled to said first detection transistor and a second detection transistor coupled to said field effect transistor, the output signal delivered by said second detection transistor being said polarity representative signal.

7. A supervisory electronic control apparatus according to claim 6, further including third means responsive to said first means for generating an auxiliary output signal representative of the instantaneous condition of the telegraphy line, said third means comprising a diode.

8. An apparatus according to claim 6, wherein said one control transistor and said supervisory output control transistor each have an electrode thereof connected through a respective Zener diode to an additional source of reference potential.

9. An apparatus according to claim 6, wherein said capacitor is connected directly between said control transistors.

10. An apparatus according to claim 8, wherein said first detector transistor has its base and emitter electrodes connected across a parallel resistor-diode combination inserted in said telegraphy line and has its collector electrode resistively coupled to the gate electrode of said field effect transistor, the source of which is connected to a further source of potential.

11. An apparatus according to claim 9, wherein said second detector transistor is resistively connected to the drain electrode of said field effect transistor and the source of bias voltage therefor and has its collector electrode diode coupled to the base of said first control transistor and to said first voltage polarity sensitive circuit.

12. An apparatus according to claim 11, further including a second voltage polarity sensitive circuit connected to said first voltage polarity sensitive circuit and wherein the collector electrode of said supervisory output control transistor is directly connected to said second voltage polarity sensitive circuit, while the base electrode thereof is directly connected to the collector electrode of said other control transistor.

13. An apparatus according to claim 12, wherein the emitter electrodes of said control transistors are diode coupled to said additional source of reference potential.

14. A supervisory electronic control apparatus for monitoring telegraphy line signals and adapted to be inserted at any point in a telegraphy channel, comprising:

first means responsive to the condition of the telegraphy line for generating a supervisory output signal upon the receipt of a calling signal potential on said telegraphy line, including a first transistor circuit connected in the line for detecting the polarity of the line potential and for generating a signal representative of said polarity and a first voltage polarity sensitive circuit responsive to the signal generated by said first transistor circuit for delivering a supervisory output signal at the output of said first means when said transistor circuit detects the polarity of the line potential to be that of a calling signal; and second means responsive to said first means for maintaining the generation of said supervisory output signal during the transmission of modulated telegraphy signals, which follow said calling signal over said telegraphy channel, and for terminating the generation of said supervisory output signal a predetermined time after the receipt of a release signal potential on said telegraphy line, wherein said first transistor circuit includes a first detection transistor connected across a diode inserted in the telegraphy line, a field effect transistor coupled to said first detection transistor and a second detection transistor coupled to said field effect transistor, the output signal delivered by said second detection transistor being said polarity representative signal.

15. A supervisory electronic control apparatus for monitoring telegraphy line signals and adapted to be inserted at any point in a telegraphy channel comprising:

first means, responsive to the condition of the telegraphy line for generating a supervisory output signal upon the receipt of a calling signal potential on said telegraphy line; and second means responsive to said first means for maintaining the generation of said supervisory output signal during the transmission of modulated telegraphy signals which follow said calling signal over said telegraphy channel and for terminating the generation of said supervisory output signal a predetermined time after the receipt of a release signal potential on said telegraphy line, wherein said first means includes a first transistor circuit connected in the line for detecting the polarity of the line potential and for generating a signal representative of said polarity, and a first voltage polarity sensitive circuit responsive to the signal generated by said first transistor circuit for delivering a supervisory output signal at the output of said first means when said transistor circuit detects the polarity of the line potential to be that of a calling signal, and wherein said second means includes a delay circuit responsive to the output of said first transistor circuit and a second voltage polarity sensitive circuit connected to said delay circuit and connected to said first voltage polarity sensitive circuit for maintaining the delivery of said supervisory output signal by said second voltage polarity sensitive circuit during the portions of the transmission of modulated telegraphy signals when the polarity of the line potential is opposite to the polarity of the line potential during the transmission of a calling signal, and wherein said voltage polarity sensitive circuit comprises a first diode and said second voltage polarity sensitive circuit comprises a second diode each of which is connected together to provide said supervisory signal.

16. An apparatus according to claim 15, wherein said delay circuit includes a holding circuit for storing a reference, potential, a pair of control transistors connected to opposite sides of said holding circuit, one of said control transistors being connected also to said first transistor circuit for controlling the storing of said reference potential in said holding circuit, in response to the signal generated by said first transistor circuit, the other of said control transistors being connected to the discharging of the reference potential from said holding circuit, for controlling the length of time that the delivery of said supervisory output signal is maintained and wherein said holding circuit includes a capacitor connected between said pair of control transistors and a discharging resistor connected between the side of said capacitor, which is connected to said other control transistor, and a fixed reference potential for discharging said capacitor.

17. An apparatus according to claim 16, wherein said delay circuit further includes a supervisory output control transistor connected to said voltage polarity sensitive circuit and said other control transistor for controlling the maintaining of the supervisory output signal during the portion of the transmission of the modulated telegraphy signals when the polarity of the line potential is opposite to the polarity of the line potential during the transmission of a calling signal and wherein said holding circuit includes a capacitor connected between said pair of control transistors and a discharging resistor connected between the side of said capacitor, which is connected to said other control transistor, and a fixed reference potential for discharging said capacitor, and for rendering said other control transistor conductive a predetermined time after the termination of said signal generated by said first transistor circuit representative of said polarity, thereby cutting off said supervisory output control transistor and terminating the generation of said supervisory output signal.

18. An apparatus according to claim 17, wherein said first transistor circuit includes a first detection transistor connected across a diode inserted in the telegraphy line, a field effect transistor coupled to said first detection transistor and a second detection transistor coupled to said field effect transistor, the output signal delivered by said second detection transistor being said polarity representative signal.

* * * * *